United States Patent [19]
Hiatt et al.

[11] Patent Number: 4,652,452
[45] Date of Patent: Mar. 24, 1987

[54] OXALIC ACID REMOVAL IN BEER PRODUCTION

[75] Inventors: William R. Hiatt, Davis; Joseph L. Owades, Sonoma, both of Calif.

[73] Assignee: Calgene, Inc., Davis, Calif.

[21] Appl. No.: 700,241

[22] Filed: Feb. 11, 1985

[51] Int. Cl.$^4$ .............................................. C12C 11/04
[52] U.S. Cl. ....................................... 426/16; 435/93
[58] Field of Search ............... 426/16, 13, 29; 435/93, 435/232

[56] References Cited

U.S. PATENT DOCUMENTS 2,624,675  1/1953  Wallerstein et al. ................ 435/232
4,518,692  5/1985  Rozzell ................................ 435/116

OTHER PUBLICATIONS

DeClerek, "A Textbook of Brewing", vol. 1, Chapman & Hall Publishers, London, 1957, p. 553.
Jakoby, "Oxalate Decarboxylation", Methods of Enzymology, vol. V (1962), pp. 637-640.

Primary Examiner—R. B. Penland
Attorney, Agent, or Firm—Bertram I. Rowland

[57] ABSTRACT

Beer production is improved by the introduction of oxalate decarboxylase during mashing and/or fermentation. The addition of the oxalate decarboxylase diminishes or eliminates calcium oxalate precipitation as a deposit on tank walls and equipment.

7 Claims, No Drawings

OXALIC ACID REMOVAL IN BEER PRODUCTION

BACKGROUND OF THE INVENTION

1. Field of the Invention

Oxalic acid is a constituent of barley. The amount of barley used as malt in beer brewing, contributes approximately 30-60 ppm ($2-4\times10^{-7}$M) oxalic acid (as calcium oxalate) to wort. This level must be lowered to less than about 15 ppm in finished beer to prevent the problem of "gushing," whereby beer gushes from the bottle when opened. Currently, removal of oxalic acid is achieved by precipitation. During mashing, calcium is added to the malt-water mixture to stabilize and activate amylases. The presence of calcium ions forms insoluble calcium oxalate, which deposits on the walls of tanks during beer fermentation and maturation. This precipitate ("beerstone") harbors contaminating microorganisms and must be removed after each fermentation by scrubbing with a solution of a chelating agent and alkali. Removal of the beerstone is both costly and labor intensive.

It would therefore be desirable to be able to avoid the production of beerstone. Any method must take into consideration the various stages of beer production and the effect any additive might have on the processing and quality of the final product.

2. Description of the Prior Art

The Practical Brewer, A Manual for the Brewing Industry, 2nd ed. (Broderick ed.), Master Brewers Assoc. of the Americas, 1977, and Modern Brewing Technology, (Findlay, ed.) Macmillan Press, N.Y. 1971 are texts providing general descriptions of the brewing process. Modern Brewing Technology, pp. 201-203 describes the various cleaning material used in cleaning fermentation tanks. The following references describe analytical procedures for detecting oxalate: Bernstein and Khan, Proc. A.M. Amer. Soc. Brew. Chem. 1973: 20-23 (Abstracts (1974) 80:583; and Haas and Fleischman, J. Agric. & Food Chem. (1961) 9:451-452 (Abstracts (1962) 68:211). The references describe the problems of oxalate and oxalate sediments in beer production: Burger et al., Proc. A.M. Amer. Soc. Brew. Chem 1956: 169-178; and Burger et al., ibid 1956: 179-192.

SUMMARY OF THE INVENTION

An improved process for the production of beer is provided by introducing oxalate decarboxylase (EC 4.1.1.2) at at least one of the stages in the beer-making process to substantially reduce or eliminate the formation of calcium oxalate as a precipitate.

DESCRIPTION OF THE SPECIFIC EMBODIMENTS

In preparing beer, there are certain basic steps involved with solubilization of the grains employed for the sugar and protein source and fermentation of the sugar for production of alcohol and other minor components of the final product. Barley is the predominant raw material of beer and is added in the form of malt. Addition of water to malt brings forth enzymes which will be active during the mashing process. Included with the barley may be other grains, such as rice, corn, sorghum, wheat, as well as other starch sources, such as manioc and potato. Also included during the mashing process is hops which serves to add flavor to the beer, as well as increasing the biological stability of the beer and improving the head retention and body of the beer.

The waters used during the mashing process will vary widely as to their mineral content, depending upon the particular location of the brewery and whether the content of the water is modified.

The enzyme primarily responsible for the breakdown of the starch is α-amylase. The temperature of the mashing will generally range between 50°-80° C., frequently involving incremental increases through the range, where different temperatures enhance the enzymatic activity of different enzymes and their respective reactions. During the mashing, the pH is generally on the acidic side, usually in the range from about 5 to 6.

At the same time as amylase is breaking down the polysaccharides, the proteases are breaking down proteins to polypeptides and amino acids. Thus, the barley malt and other additives are broken down into solubilized products to provide a wort.

The wort may then be filtered in a variety of ways to remove particulate matter, followed by boiling, generally at or above the boiling point of water, usually not exceeding about 105° C.

The hot wort results in a warm sludge which is removed by centrifugation or other convenient method and the wort cooled to 50° or below. To the wort is then added about 0.5-1.0% by volume of yeast for fermentation. The temperature during the fermentation will generally range from about 5°-25° C., where cooling may bring the fermented product down to as low as about 5° C. The yeast may then be removed by any convenient technique, e.g., sedimentation, centrifugation or the like, to provide green beer which may then be further processed for maturing and clarification.

During this process small amounts of oxalate decarboxylase may be added at one or more stages, the choice and amount of the enzyme being related to its activity under the processing conditions of the beer. The same or different oxalate decarboxylases may be used at various stages.

Various microorganisms may be employed as a source for oxalate decarboxylase. The microorganisms include fungi, such as Aspergillus, Myrothecium, and Collybia (Flammulina). The oxalate decarboxylase enzymes will have optimum pHs in the range of about 3 to 6, optimum temperatures in the range of about 35°-75° C. and $K_m$ maximum for oxalic acid of less than about $10^{-2}$M, preferably less than about $10^{-3}$M.

The enzymes which are employed may be naturally occurring enzymes, either wild type or alleles thereof, or the enzymes may be mutagenized in accordance with conventional ways and screened in order to be assayed for improved properties, such as activity, pH and temperature response, or the like. Techniques for mutagenizing include ultraviolet radiation, nitrosourea, ethyl methanesulfonate, etc. The mutagenized host may be cloned, lysed and screened for oxalate decarboxylase activity in accordance with known assays.

The addition of the oxalate decarboxylase will be at the beginning of or during mashing and/or at the beginning of fermentation. The concentration at the mashing stage will be in the range of about 0.05-1 enzyme activity unit/ml, while the fermentation stage will have about 0.005-1 enzyme activity unit/ml (one enzyme activity unit will convert 1.0 μmole of oxalate to formate and carbon dioxide per minute at 37° C. in the presence of 0.13M potassium citrate and 3.3 mM potassium oxalate at the pH of the stage of the beer fermenting process). During the fermentation, the beginning will generally be within the first three days, preferably within the first day.

In carrying out the method, the enzyme is merely added to the wort or fermenting brew at the appropriate time and in sufficient amount to substantially reduce the oxalate concentration to below about 15 ppm at a time at least prior to completion of fermentation, preferably within about three days of the beginning of fermentation, so as to provide a process where no significant precipitation of calcium oxalate is observed.

The following examples are offered by way of illustration and not by way of limitation.

EXPERIMENTAL

Materials and Methods

Materials.

Partially purified preparations of oxalate decarboxylase (ODC) were from *Collybia velutipes* (Sigma Chemical Co., 0-3500) and Aspergillus (Boehringer Mannheim, 479-586). Uniformly labeled [$^{14}$C] oxalic acid (88 mCi/mmol. 682 μCi/mg) was obtained from Amersham. Brewer's Art Dried Malt extract (Wine Art Inc., San Francisco, Calif.) was used where indicated.

Methods. Assay of oxalate decarboxylase.

The assay for ODC is based on the ability to precipitate [$^{14}$C] oxalic acid from reaction mixtures with calcium. Precipitates are collected on filters, and the amount of precipitated radioactive material is determined by liquid scintillation counting. The amount of OCD activity is proportional to the decrease observed in $Ca^{++}$-precipitable radioactivity.

Standard reactions contained 0.05-0.4 units of enzyme activity (one unit will convert 1.0 μmole of oxalate to formate and $CO_2$ per minuted at 37° C.), 0.13M potassium citrate, 3.3 mM potassium oxalate, and 0.1 μCi of [$^{14}$C] oxalic acid. Reactions were adjusted to a pH of 3.0 for Collybia ODC and pH 5.0 for Aspergillus ODC, and to a final volume of 300 μl.

Reactions were incubated at 37° C. for 30 min, then stopped by heating to 100° C. and placed on ice. Oxalic acid was precipitated from reaction mixtures by the addition of 0.1 ml of 1M potassium oxalate followed by 2 ml of 0.1M $CaCl_2$. Following incubation for 10 min on ice, precipitates were collected by filtration through Whatman GF/A glass fiber filters. Filters were placed in Aquasol II scintillation fluid (New England Nuclear) and counted in a Beckman LS-8000 liquid scintillation counter. Results are expressed as the percent of $Ca^{++}$-precipitable [$^{14}$C] oxalic acid present at the start of the reaction.

Results

Standard reaction mixture.

Results obtained with Collybia and Aspergillus ODC in the standard reaction mixture are shown in Table 1.

TABLE 1

Activities of ODC in standard reaction mixture*.

| Enzyme | Units | precipitable [$^{14}$C] oxalate | |
|---|---|---|---|
| | | cpm | % initial level |
| None | 0 | 88980 | 100 |
| Collybia | 0.05 | 2689 | 3.0 |
| Aspergillus | 0.4 | 453 | 0.5 |

*Standard reaction mixture as described in Materials and Methods.

Under these conditions, both enzymes are effective in removal of $Ca^{++}$-precipitable oxalic acid. The standard reaction mixture contains a much higher concentration of oxalate than found during brewing. The Km of either Aspergillus or Collybia ODC for oxalic acid is relatively high ($Km = 2 \times 10^{-3}M$).

As shown in Table 2, lowering the oxalic acid concentration to $2 \times 10^{-7}M$ does not inhibit the reaction.

TABLE 2

ODC activity at lowered substrate concentration*.

| Enzyme | Units | precipitable [$^{14}$C] oxalate | |
|---|---|---|---|
| | | cpm | % initial level |
| None | — | 12755 | 100 |
| Collybia | 0.05 | 387 | 3.0 |
| Aspergillus | 0.4 | 419 | 3.3 |

*Standard reaction mixture except oxalic acid conc. of $2 \times 10^{-7}$ M (0.01μ Ci of [$^{14}$C] oxalic acid, sp. act. 0.682 Ci/g)

ODC activity under mashing conditions.

The first study was under the conditions of mashing. The critical parameters of this step are the concentration of dissolved solids, temperature, and pH. In the following tables, the conditions are 0.3 units of enzyme, $2 \times 10^{-7}M$ oxalic acid (0.01 μCi [$^{14}$C] oxalic acid), and malt extract (31.5% w/v) to a final volume of 500 μl. (A) No enzyme; (B) Collybia ODC; (C) Aspergillus ODC. Normally the mash contains 28-35% as dry solids with a pH of 5.4. ODC activity at 37° C. under these conditions is shown in the following Table 3.

TABLE 3

ODC activity during mashing

| | % precipitable [$^{14}$C] oxalic acid at indicated time of incubation (min) | | | |
|---|---|---|---|---|
| | 0 | 10 | 20 | 30 |
| A | 100 | 105 | 97 | 100 |
| B | 100 | 120 | 100 | 107 |
| C | 100 | 48 | 20 | 20 |

Aspergillus ODC displayed substantial activity under these conditions.

Mashing occurs at temperature steps of 50° C., 65° C., and 75° C. The activity of ODC enzymes at the first two temperatures is shown in Tables 4 and 5.

TABLE 4

ODC activity during mashing - 50° C.

| | % precipitable [$^{14}$C] oxalic acid at indicated time of incubation (min) | | | |
|---|---|---|---|---|
| | 0 | 10 | 20 | 30 |
| A | 100 | 130 | 110 | 105 |
| B | 100 | 108 | 80 | 75 |
| C | 100 | 30 | 18 | 12 |

TABLE 5

ODC activity during mashing - 64° C.

| | % precipitable [$^{14}$C] oxalic acid at indicated time of incubation (min) | | | |
|---|---|---|---|---|
| | 0 | 10 | 20 | 30 |
| A | 100 | 100 | 114 | 92 |
| B | 100 | 84 | 110 | 92 |
| C | 100 | 74 | 76 | 68 |

Aspergillus ODC shows good activity at 50° C., while this activity is partially lost at 64° C.

ODC activity during fermentation.

Following mashing and filtration, the wort is cooled to 5°-10° C. for fermentation. It is at this stage that most of the oxalic acid precipitates. ODC added during cooling prevents precipitation at 5°–10° during the early stages of fermentation, which lasts 7–10 days. This is shown for both Collybia and Aspergillus ODC in Table 6.

TABLE 6

| | Oxalate decarboxylase activity at 5° C.* | | |
|---|---|---|---|
| Enzyme | Time of Incubation (days) | precipitable [$^{14}$C] oxalate cpm | % initial level |
| None | 0 | 9960 | 100 |
| | 3 | 8765 | 88 |
| Collybia | 0 | 9976 | 100 |
| | 3 | 153 | 1.5 |
| Aspergillus | 0 | 9982 | 100 |
| | 3 | 191 | 1.9 |

*Reaction conditions are the same as employed for Tables 3–5 except reactions were incubated 3 days at 5° C.

The amount of ODC activity required during fermentation is shown in Table 7.

TABLE 7

| | Amount of ODC required during fermentation | | | |
|---|---|---|---|---|
| | % precipitable [$^{14}$C] oxalate after addition of indicated amount ODC (units/ml) | | | |
| Enzyme | Time of Incubation (days) | 0.8 | 0.08 | 0.008 | 0.0008 |
| Collybia | 0 | 100 | 100 | 100 | 100 |
| | 1 | 2.1 | 33 | 77 | 85 |
| | 2 | 2.5 | 7.4 | 69 | 83 |
| | 3 | 2.1 | 1.6 | 45 | 81 |
| Aspergillus | 0 | 100 | 100 | 100 | 100 |
| | 1 | 1 | 11.9 | 58 | 71 |
| | 2 | 1.6 | 3.2 | 48 | 82 |
| | 3 | 1 | 1.8 | 28 | 67 |

Thus, approximately 0.008 units/ml of either Collybia or Aspergillus ODC were sufficient to reduce oxalate concentrations by greater than 50%. Similar experiments demonstrated that at least 0.08 units/ml of Aspergillus ODC is required during mashing (50° C.).

It is evident from the above results that oxalate decarboxylase can be used in conjunction with the process for producing beer so as to avoid precipitation of calcium oxalate during the process. Thus, an economic and efficient method is provided, which substantially avoids the labor intensive and costly procedure of removing solid calcium oxalate precipitates from the processing equipment. Furthermore, the potential for the calcium oxalate harboring contaminating microorganisms is also avoided and calcium oxalate is transformed into carbon dioxide and formic acid which are both normal components of beer. The calcium formate remains soluble and does not cause adverse effects.

Although the foregoing invention has been described in some detail by way of illustration and example for purposes of clarity of understanding, it will be obvious that certain changes and modifications may be practiced within the scope of the appended claims.

What is claimed is:

1. An improved method for producing beer which comprises:
   introducing not later than the beginning of the fermentation stage an effective amount of an oxalate decarboxylase enzyme (EC 4.1.1.2) active under the conditions of the brewing medium to reduce the amount of oxalate in the medium to at least substantially prevent the formation of calcium oxalate precipitate.

2. The method according to claim 1, wherein said enzyme is introduced during mashing.

3. The method according to claim 1, wherein said enzyme is introduced at the beginning at fermentation.

4. The method according to claim 1, where enzyme is added at both stages of mashing and fermentation.

5. The method according to claim 1, wherein said enzyme is obtained from *Collybia* (Flammulina) *velutipes*.

6. The method according to claim 1, wherein said enzyme is obtained from Aspergillus.

7. A method for inhibiting the formation of calcium oxalate precipitate during the mashing and fermentation stages of beer production, said method comprising:
   introducing from about 0.05–1 unit/ml of enzyme activity of oxalate decarboxylase derived from Aspergillus or Collybia at the mashing stage and 0.005–0.1 unit/ml of oxalate decarboxylase from Aspergillus or Collybia at the fermentation stage, whereby the oxalate is substantially decomposed and calcium oxalate precipitation is avoided.

* * * * *